(12) United States Patent
Nakazawa

(10) Patent No.: US 8,379,113 B2
(45) Date of Patent: Feb. 19, 2013

(54) IMAGING APPARATUS, IMAGE CORRECTION METHOD, AND COMPUTER-READABLE RECORDING MEDIUM

(75) Inventor: Michitaka Nakazawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/142,749

(22) PCT Filed: Mar. 3, 2010

(86) PCT No.: PCT/JP2010/053926
§ 371 (c)(1),
(2), (4) Date: Jun. 29, 2011

(87) PCT Pub. No.: WO2010/104089
PCT Pub. Date: Sep. 16, 2010

(65) Prior Publication Data
US 2011/0292227 A1     Dec. 1, 2011

(30) Foreign Application Priority Data
Mar. 11, 2009   (JP) ................................. 2009-058244

(51) Int. Cl.
*H04N 5/262* (2006.01)
*H04N 13/02* (2006.01)
(52) U.S. Cl. ....................................... 348/240.1; 348/47
(58) Field of Classification Search ................. 348/240.1
See application file for complete search history.

(56) References Cited

U.S. PATENT DOCUMENTS

| 4,999,713 A * | 3/1991 | Ueno et al. ................. 348/240.3 |
| 6,263,164 B1 * | 7/2001 | Nakahara et al. ............. 396/104 |
| 6,512,892 B1 * | 1/2003 | Montgomery et al. ........ 396/326 |
| 6,751,020 B2 * | 6/2004 | Sugawara ........................ 348/42 |
| 7,092,015 B1 * | 8/2006 | Sogawa ..................... 348/222.1 |
| 2001/0019450 A1 * | 9/2001 | Ogino ........................... 359/462 |

(Continued)

FOREIGN PATENT DOCUMENTS

| JP | 6-296252 A | 10/1994 |
| JP | 7-95623 A | 4/1995 |
| JP | 8-317424 A | 11/1996 |
| JP | 8-317429 A | 11/1996 |
| JP | 9-37302 A | 2/1997 |

(Continued)

OTHER PUBLICATIONS

Office Action issued from JPO on Dec. 28, 2011 in connection with JP Application No. 2009-058244.

*Primary Examiner* — Sinh Tran
*Assistant Examiner* — Jason Flohre
(74) *Attorney, Agent, or Firm* — Birch, Stewart, Kolasch & Birch, LLP

(57) ABSTRACT

An imaging apparatus includes: an imaging unit for acquiring a plurality of viewpoint images imaged from a plurality of view-points by a plurality of imaging optical systems each including a zoom lens; a storage unit for storing an error of the imaging optical system; an optical zoom magnification specifying unit for receiving specification instruction of an optical zoom magnification; a zoom lens driving unit for moving the zoom lens to a position corresponding to the instruction of the optical zoom magnification; and a correction unit for setting an electronic zoom magnification corresponding to the position of the zoom lens, magnifying a viewpoint image to be corrected from within the plurality of viewpoint images based on the electronic zoom magnification, and extracting a part of the magnified viewpoint image to eliminate an object point shift amount corresponding to the error from the magnified viewpoint image.

4 Claims, 11 Drawing Sheets

U.S. PATENT DOCUMENTS

| | | | |
|---|---|---|---|
| 2002/0141635 A1* | 10/2002 | Swift et al. | 382/154 |
| 2003/0020814 A1* | 1/2003 | Ono | 348/220.1 |
| 2003/0160886 A1* | 8/2003 | Misawa et al. | 348/347 |
| 2007/0058961 A1* | 3/2007 | Kobayashi et al. | 396/88 |
| 2007/0064141 A1* | 3/2007 | Misawa et al. | 348/333.01 |
| 2007/0064142 A1* | 3/2007 | Misawa et al. | 348/333.01 |
| 2008/0079824 A1* | 4/2008 | Sawachi | 348/240.1 |
| 2008/0106620 A1* | 5/2008 | Sawachi | 348/262 |
| 2008/0112616 A1* | 5/2008 | Koo et al. | 382/171 |
| 2011/0074770 A1* | 3/2011 | Robinson et al. | 345/419 |

FOREIGN PATENT DOCUMENTS

| | | |
|---|---|---|
| JP | 11-355624 A | 12/1999 |
| JP | 2004-221700 A | 8/2004 |
| JP | 2005-20606 A | 1/2005 |
| JP | 2005-45328 A | 2/2005 |
| JP | 2005-210217 A | 8/2005 |
| JP | 2006-162991 A | 6/2006 |
| JP | 2006-251683 A | 9/2006 |
| JP | 2007-28283 A | 2/2007 |

* cited by examiner

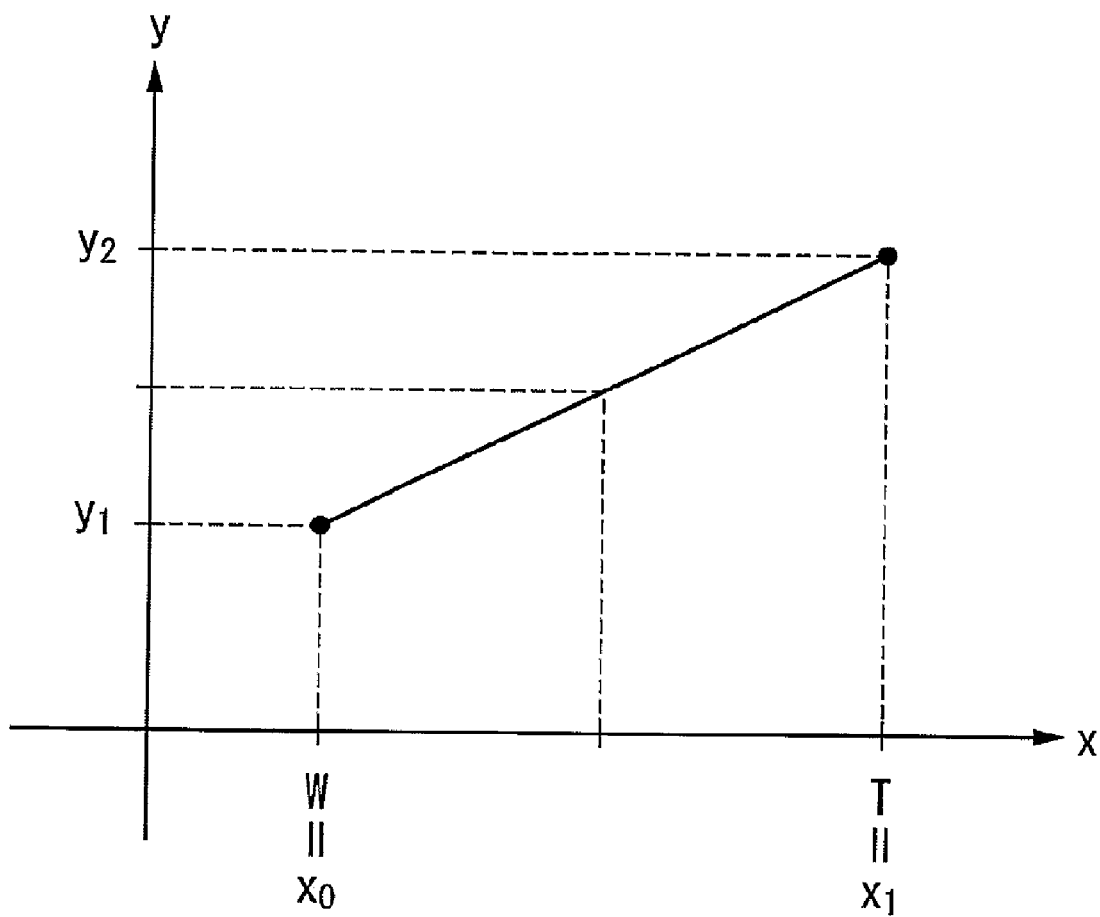

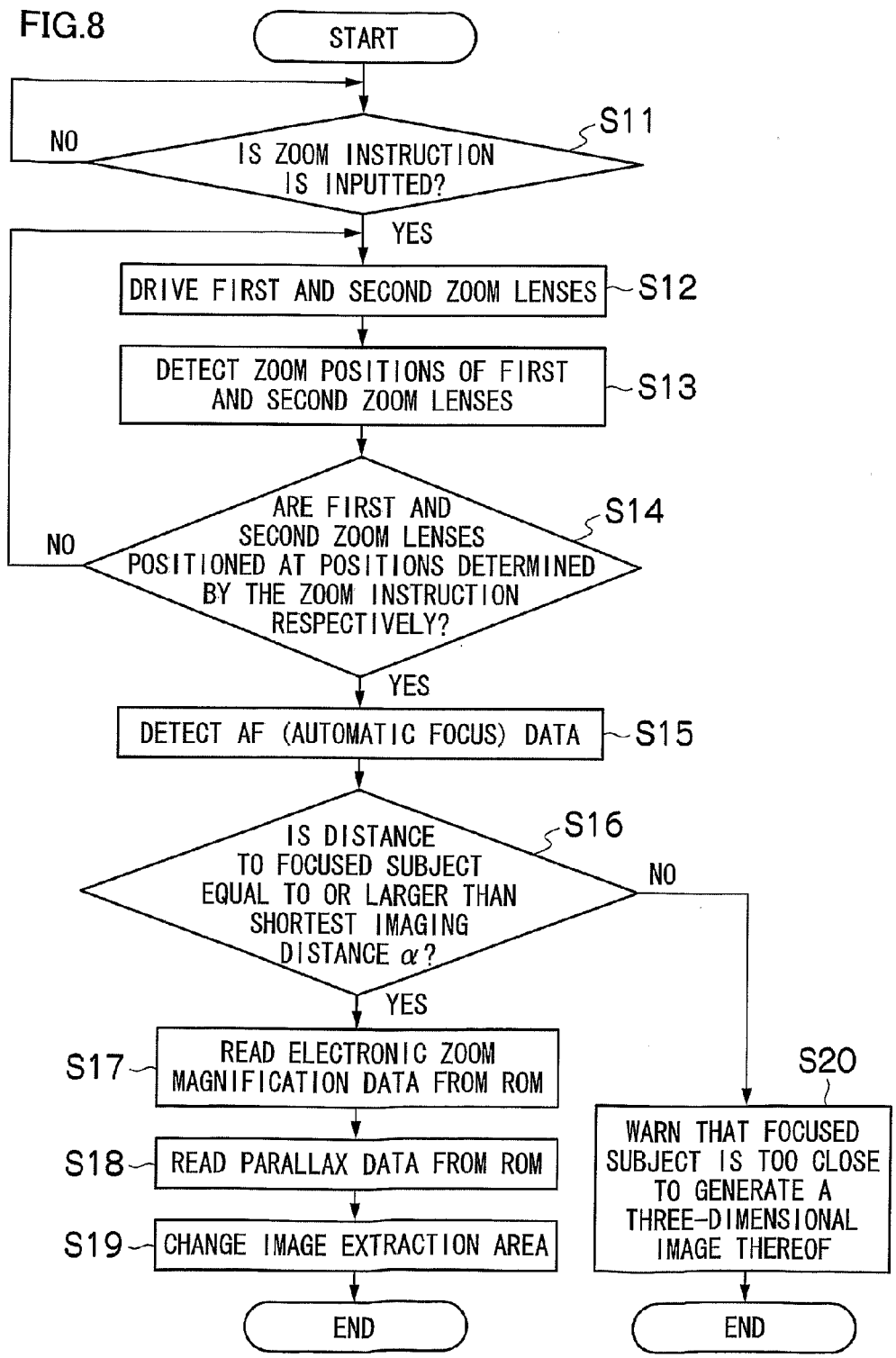

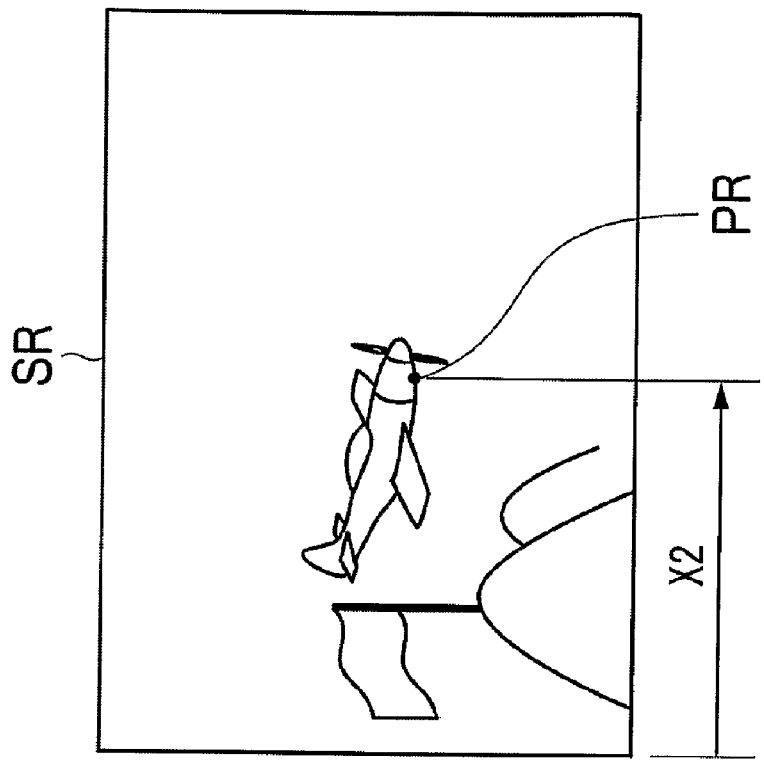
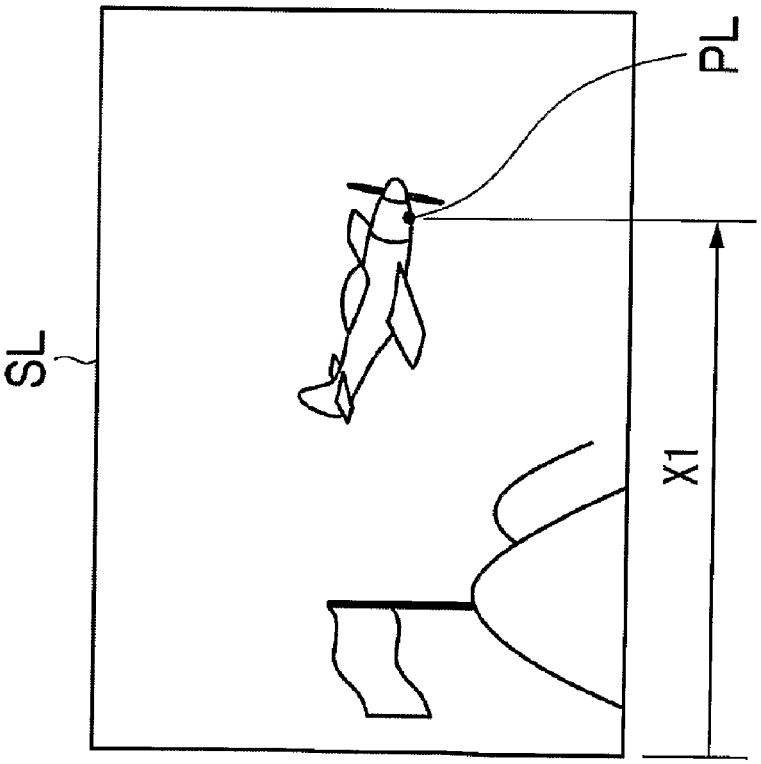

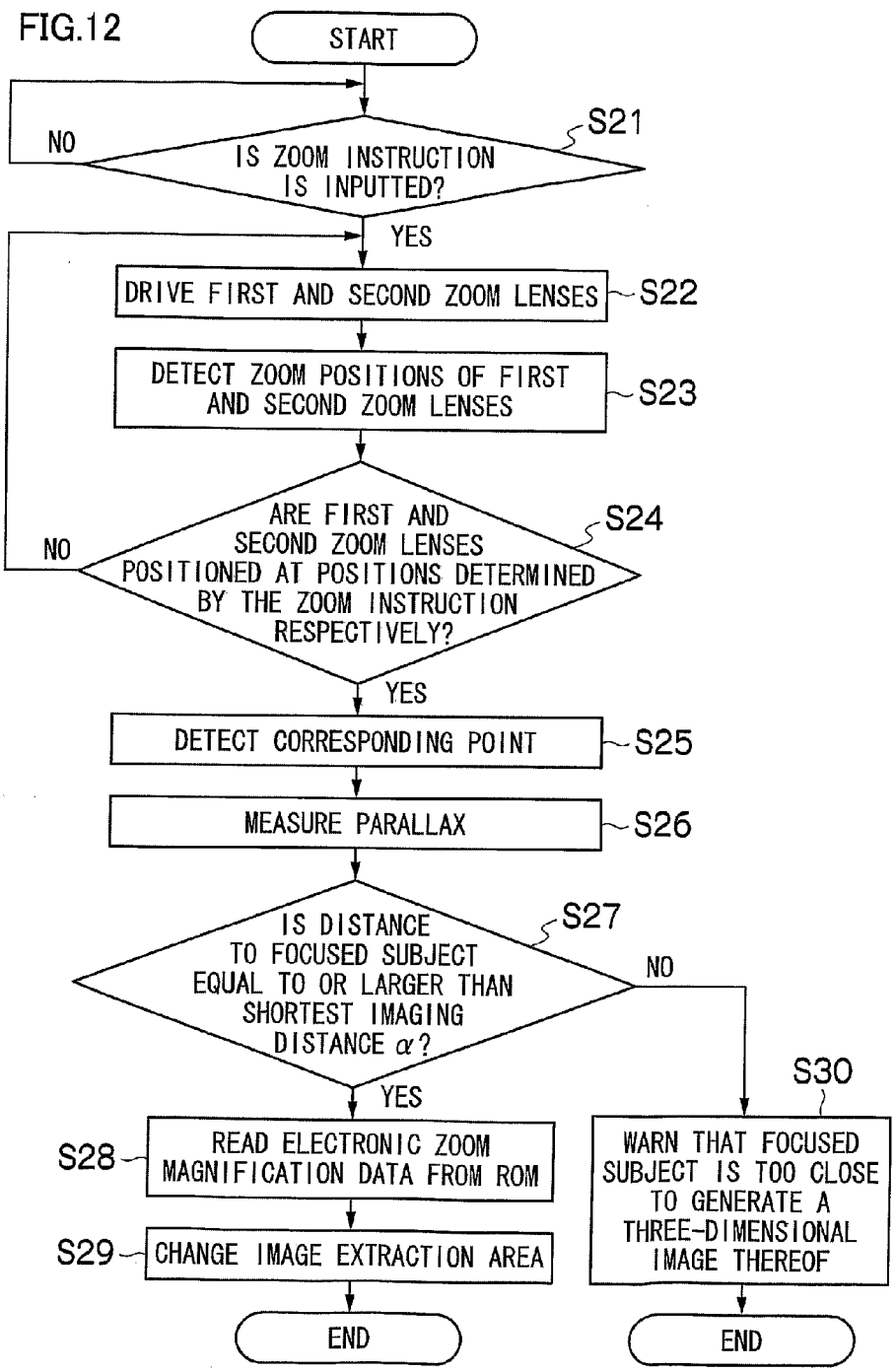

IMAGING APPARATUS, IMAGE CORRECTION METHOD, AND COMPUTER-READABLE RECORDING MEDIUM

TECHNICAL FIELD

The presently disclosed subject matter relates to an imaging apparatus capable of acquiring images from a plurality of viewpoints (multi-viewpoints).

BACKGROUND ART

PTL 1 discloses a stereoscopic imaging apparatus including a first lens barrel 1R having a CCD 16R for obtaining imaging information for a right eye; a second lens barrel 1L having a CCD 16L for obtaining the imaging information for a left eye; a camera detection circuit 43 for detecting a focal length of the first lens barrel 1R and a focal length of the second lens barrel 1L; a ROM 47 including an EEPROM for preliminarily storing a shift amount of the first lens barrel 1R and the second lens barrel 1L from the respective centers of optical axes in the respective focal lengths; and a CPU 46 for controlling an image extraction area in at least one of the CCDs 16R and 16L at the respective focal lengths based on an output of the ROM 47.

PTL 2 discloses a stereoscopic camera 2 including: first and second potentiometers 25 and 35 for detecting positions of first and second variable power lenses 21 and 31 respectively; a correction data storage unit 52 for storing a power difference D1 between the first and second variable power lenses 21 and 31 for each predetermined position; an electronic variable power circuit 53 for electronically changing a magnification of second image data (performing a digital zoom (electronic zoom) on second image data) based on the power difference D1; and a CPU 40 for reading the power difference D1 corresponding to the detected positions of the potentiometers 25 and 35 from the correction data storage unit 52 and setting the read power difference D1 in the electronic variable power circuit 53 so as to match an imaging range of the first image data with an imaging range of the second image data. The stereoscopic camera 2 further includes a coordinate conversion circuit for storing an optical axis coordinate difference between the first and second variable power lenses 21 and 31 in the correction data storage unit 52 and converting the coordinates of the second image data based on the optical axis coordinate difference.

In PTL 3, AF drive circuits 2 and 13 control focusing of left and right imaging lenses 1 and 12 respectively; outputs of a CCD 3 and a CCD 14 are written to electronic zoom memories 6 and 17; a microcomputer 23 controls the extraction position of an electronic zoom extraction frame based on the AF data proportional to the subject distance; and thereby the convergence angle is electronically controlled.

In addition, other related arts related to the presently disclosed subject matter are included in the following PTLs 4 to 8.

CITATION LIST

Patent Literature

PTL 1: Japanese Patent Application Laid-Open No. H08-317424
PTL 2: Japanese Patent Application Laid-Open No. 2006-162991
PTL 3: Japanese Patent Application Laid-Open No. H07-95623
PTL 4: Japanese Patent Application Laid-Open No. H06-296252
PTL 5: Japanese Patent Application Laid-Open No. 2006-251683
PTL 6: Japanese Patent Application Laid-Open No. 2005-20606
PTL 7: Japanese Patent Application Laid-Open No. H09-037302
PTL 8: Japanese Patent Application Laid-Open No. H08-317429

SUMMARY OF INVENTION

Technical Problem

PTLs 1 and 2 each discloses a stereoscopic imaging apparatus which can electronically correct a shift of an optical axis due to an individual difference between the two variable power imaging lenses to provide an appropriate three dimensional viewing of objects. However, PTL 1 has a problem in that the image extraction position and the area change amount are calculated according to the amount of the optical axis shift between the two lenses with respect to each zoom position, and thus a different angle of view is set depending on the difference (variation) in error amount even at the same zoom position of the individual apparatus.

In PTL 2, a wide-angle lens is used as a lens included in a second imaging unit in which the electronic zoom is performed, and the angle of view is set by the lens (i.e. optical zoom) included in a first imaging unit in which the electronic zoom is not performed. Therefore, angles of view set for the first and second imaging units are set to be identical to each other. However, PTL 2 has a problem in that the structures of the two lenses are not identical to each other, and thus it is difficult to match the characteristics of the lenses such as a distortion and a chromatic aberration, and thereby an appropriate three dimensional viewing may not be provided.

PTL 3 discloses an apparatus for electronically correcting the convergence angle according to the subject distance. However, PTL 3 does not disclose means for correcting a parallactic shift when the subject matter disclosed in PTL 3 is applied to an imaging apparatus including variable power lenses. In addition, PTL 3 does not disclose means for correcting an optical axis shift between the two lenses.

In PTL 4, when the digital zoom (electronic zoom) are performed, a region of pixels from which image signals are not actually read out are occurs in proportion to the magnification of zooming up by the electronic zoom. And, the region of pixels from which image signals are not actually read out does not occur when a zoom lens is positioned at a wide end. Accordingly, in the conventional arts, when two variable power imaging lenses are located at the wide ends, the optical axis shift due to the individual difference between the two lenses cannot be electronically corrected.

In order to correct manufacturing errors and parallaxes of a plurality of variable power lenses having identical characteristics, the presently disclosed subject matter sets a magnification of an electronic zoom in a uniformed manner according to an optical zoom position (position of the variable power lenses) so as to obtain an appropriate three dimensional image and to maximize the angle of view on the wide angle side.

Solution to Problem

An imaging apparatus according to the presently disclosed subject matter can include: an imaging unit for acquiring a plurality of viewpoint images imaged from a plurality of viewpoints by a plurality of imaging optical systems each including a zoom lens; a storage unit for storing an error of the imaging optical system; an optical zoom magnification specifying unit for receiving a specification instruction of an optical zoom magnification; a zoom lens driving unit for moving the zoom lens to a position corresponding to the instruction of the optical zoom magnification received by the optical zoom magnification specifying unit; and a correction unit for setting an electronic zoom magnification corresponding to the position of the zoom lens moved by the zoom lens driving unit, magnifying a viewpoint image to be corrected from within the plurality of viewpoint images based on the electronic zoom magnification, and extracting a part of the magnified viewpoint image to eliminate an object point shift amount corresponding to the error stored in the storage unit from the magnified viewpoint image.

An imaging apparatus according to the presently disclosed subject matter can include: an imaging unit for acquiring a plurality of viewpoint images imaged from a plurality of viewpoints by a plurality of imaging optical systems each including a zoom lens; a storage unit for storing a parallax corresponding to a distance to a subject of each viewpoint image acquired by each imaging optical system; an optical zoom magnification specifying unit for receiving a specification instruction of an optical zoom magnification; a zoom lens driving unit for moving the zoom lens to a position corresponding to the instruction of the optical zoom magnification received by the optical zoom magnification specifying unit; a distance measuring unit for measuring a distance to a subject; and a correction unit for setting an electronic zoom magnification corresponding to the distance to the subject measured by the distance measuring unit and the position of the zoom lens moved by the zoom lens driving unit, magnifying a viewpoint image to be corrected from within the plurality of viewpoint images based on the electronic zoom magnification, and extracting a part of the magnified viewpoint image for securing a parallax stored in the storage unit from the magnified image.

An imaging apparatus according to the presently disclosed subject matter can include: an imaging unit for acquiring a plurality of viewpoint images imaged from a plurality of viewpoints by a plurality of imaging optical systems each including a zoom lens; a parallax measuring unit for measuring a parallax by detecting a pair of corresponding point from the viewpoint images acquired by each imaging optical system; an optical zoom magnification specifying unit for receiving a specification instruction of an optical zoom magnification; a zoom lens driving unit for moving the zoom lens to a position corresponding to the instruction of the optical zoom magnification received by the optical zoom magnification specifying unit; and a correction unit for setting an electronic zoom magnification corresponding to the position of the zoom lens moved by the zoom lens driving unit, magnifying a viewpoint image to be corrected from within the plurality of viewpoint images based on the electronic zoom magnification, and extracting a part of the magnified viewpoint image for securing a predetermined applied parallax range from the magnified image.

The electronic zoom magnification set by the correction unit can increase as the position of the zoom lens moves from a wide angle side to a telephoto side.

The imaging apparatus can further include a three dimensional image processing unit for generating a three dimensional image based on the image extracted by the correction unit and the viewpoint image other than the viewpoint image to be corrected, and outputting the three dimensional image onto a predetermined display device.

An image correction method according to the presently disclosed subject matter can cause an imaging apparatus including: an imaging unit for acquiring a plurality of viewpoint images imaged from a plurality of viewpoints by a plurality of imaging optical systems each including a zoom lens; an optical zoom magnification specifying unit for receiving a specification instruction of an optical zoom magnification; and a zoom lens driving unit for moving the zoom lens to a position corresponding to the instruction of the optical zoom magnification received by the optical zoom magnification specifying unit, to execute: a step of storing an error of the imaging optical system; and a step of setting an electronic zoom magnification corresponding to the position of the zoom lens moved by the zoom lens driving unit, magnifying a desired viewpoint image to be corrected from within the plurality of viewpoint images based on the electronic zoom magnification, and extracting a part of the magnified viewpoint image to eliminate an object point shift amount corresponding to the error from the magnified viewpoint image.

An image correction method according to the presently disclosed subject matter can cause an imaging apparatus including: an imaging unit for acquiring a plurality of viewpoint images imaged from a plurality of viewpoints by a plurality of imaging optical systems each including a zoom lens; an optical zoom magnification specifying unit for receiving a specification instruction of an optical zoom magnification; and a zoom lens driving unit for moving the zoom lens to a position corresponding to the instruction of the optical zoom magnification received by the optical zoom magnification specifying unit, to execute: a step of measuring a distance to a subject; and a step of setting an electronic zoom magnification corresponding to the measured distance to the subject and the position of the zoom lens moved by the zoom lens driving unit, magnifying a viewpoint image to be corrected from within the plurality of viewpoint images based on the electronic zoom magnification, and extracting a part of the magnified viewpoint image for securing the stored parallax from the magnified image.

An image correction method according to the presently disclosed subject matter can cause an imaging apparatus including: an imaging unit for acquiring a plurality of viewpoint images imaged from a plurality of viewpoints by a plurality of imaging optical systems each including a zoom lens; an optical zoom magnification specifying unit for receiving a specification instruction of an optical zoom magnification; and a zoom lens driving unit for moving the zoom lens to a position corresponding to the instruction of the optical zoom magnification received by the optical zoom magnification specifying unit, to execute: a step of measuring a parallax by detecting a pair of corresponding point from the viewpoint images acquired by each imaging optical system; and a step of setting an electronic zoom magnification corresponding to the position of the zoom lens moved by the zoom lens driving unit, magnifying a desired viewpoint image to be corrected from within the plurality of viewpoint images based on the electronic zoom magnification, and extracting a part of the magnified viewpoint image for securing a predetermined applied parallax range from the magnified image.

A computer-readable recording medium including instructions stored thereon, such that when the instructions are read and executed by a processor, the processor is configured to perform the steps of: receiving an instruction for specifying an optical zoom magnification; moving zoom lenses included in a plurality of imaging optical systems to positions corresponding to the instruction; and setting an electronic zoom magnification corresponding to the position of the zoom lens, magnifying a viewpoint image to be corrected from within the plurality of viewpoint images imaged by using the imaging optical systems based on the electronic zoom magnification, and extracting a part of the magnified viewpoint image to eliminate an object point shift amount corresponding to an error of the imaging optical systems stored in a storage unit from the magnified viewpoint image.

A computer-readable recording medium including instructions stored thereon, such that when the instructions are read and executed by a processor, the processor is configured to perform the steps of: receiving an instruction for specifying an optical zoom magnification; moving zoom lenses included in a plurality of imaging optical systems to positions corresponding to the instruction; measuring a distance to a subject; and setting an electronic zoom magnification corresponding to the measured distance to the subject and the position of the zoom lens, magnifying a viewpoint image to be corrected from within the plurality of viewpoint images by using the imaging optical systems based on the electronic zoom magnification, and extracting a part of the magnified viewpoint image for securing a parallax corresponding to the distance to the subject of the viewpoint images stored in a storage unit from the magnified image A computer-readable recording medium including instructions stored thereon, such that when the instructions are read and executed by a processor, the processor is configured to perform the steps of: receiving an instruction for specifying an optical zoom magnification; moving zoom lenses included in a plurality of imaging optical systems to positions corresponding to the instruction; measuring a parallax by detecting a pair of corresponding point from a plurality of viewpoint images acquired by the imaging optical systems; and setting an electronic zoom magnification corresponding to the position of the zoom lens, magnifying a desired viewpoint image to be corrected from within the plurality of viewpoint images by using the imaging optical systems based on the electronic zoom magnification, and extracting a part of the magnified viewpoint image for securing a predetermined applied parallax range from the magnified image.

Advantageous Effects of Invention

According to the presently disclosed subject matter, maximum values of an optical axis shift and a parallactic shift in the manufacturing process of an individual imaging apparatus are estimated, and an image shift correction region for correcting an image shift by controlling an electronic zoom magnification corresponding to (proportional to) the position of the optical zoom lens (an optical zoom position) is uniformly set for an imaging element included in the imaging apparatus. Thereby, a correction region (part) can be set on an imaging device according to each optical zoom position. Since the electronic zoom magnification increases as the position of the zoom lens moves from the wide angle side (wide angle end side) to the telephoto side (telephoto end side), the angle of view on the wide angle side can be maximized.

BRIEF DESCRIPTION OF DRAWINGS

FIG. 5 illustrates a relationship between electronic zoom magnification data y and a current zoom position x;

FIG. 8 is a flowchart of a correction process according to the second embodiment;

FIGS. 11A and 11B illustrate an example of corresponding points; and

FIG. 12 is a flowchart of a correction process according to the third embodiment.

DESCRIPTION OF EMBODIMENTS

First Embodiment

Figure 1:
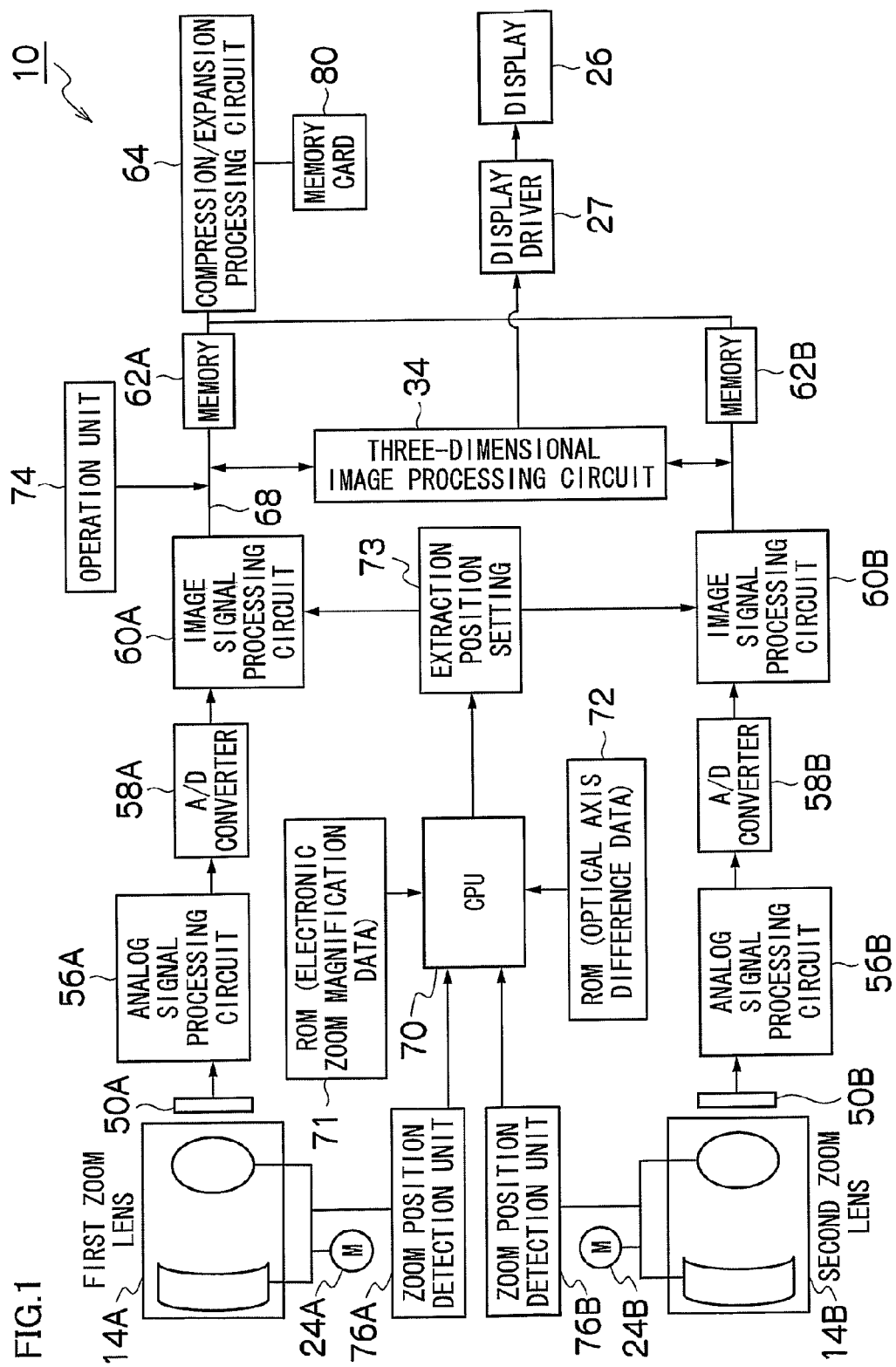
FIG. 1 is a block diagram of a camera according to a first embodiment.

FIG. 1 illustrates an electrical configuration of a camera 10 according to a first embodiment.

Each of the imaging optical systems 14A and 14B includes a zoom lens and a focus lens. The convergence angle formed between the optical axes of the imaging optical systems 14A and 14B is assumed to be mechanically fixed. Although a binocular parallax formed between the imaging optical systems 14A and 14B changes depending on a distance to a focused subject from the camera 10, in the first embodiment, it is assumed that the focused subject is located at a predetermined position and the focus lens does not move.

In response to an operation input from a zoom button of the operation unit 74, a lens motor 24A move the zoom lens of the imaging optical systems 14A along a lens optical axis of the imaging optical systems 14A to a telephoto side (zoom-in side) or a wide angle side (zoom-out side) to change a focal length (imaging magnification) of the imaging optical systems 14A, and a lens motor 24B move the zoom lens of the imaging optical systems 14B along a lens optical axis of the imaging optical systems 14B to a telephoto side (zoom-in side) or a wide angle side (zoom-out side) to change a focal length (imaging magnification) of the imaging optical systems 14B.

Two imaging elements 50A and 50B each configured of an area CCD (charge-coupled device) sensor, for example. The imaging elements 50A and 50B are disposed in a position corresponding to the respective focus positions of the imaging optical systems 14A and 14B inside the main body 12 (not illustrated) of the camera 10. Light reflected by a subject enters the imaging optical systems 14A and 14B, and the light is focused on light receiving surfaces of the imaging elements 50A and 50B respectively.

The imaging elements 50A and 50B each include a plurality of photoelectric conversion elements disposed in a matrix on the respective light receiving surface thereof. The imaging elements 50A and 50B each output an analog signal indicating an amount of light received by each of photoelectric conversion elements as an image signal. The imaging elements 50A and 50B each output the image signal in a timing synchronized with a timing signal generated by a timing signal generation unit connected to a drive circuit (not illustrated) respectively.

An aperture diaphragm (not illustrated) is disposed between the imaging optical systems 14A and 14B and the imaging elements 50A and 50B respectively. The aperture diaphragm may be configured of a single aperture which can be changed consecutively, or may be configured such that a plurality of apertures having different aperture amount are switched.

The timing signal generation unit is also connected to a flash control circuit for controlling lighting of the flash (not illustrated). When a low light intensity is detected or when a user instructs lighting of the flash, the lighting of the flash is controlled in a timing synchronized with a timing signal generated by the timing signal generation unit.

Each of the signal output ends of the imaging elements 50A and 50B is connected to analog signal processing circuits 56A and 56B, A/D converters (analog-to-digital converters) 58A and 58B, image signal processing circuits 60A and 60B, memories 62A and 62B, and compression/expansion processing circuit 64 in that order, each of which is connected to a system bus 68 and is integrally controlled by a CPU (central processing unit) 70 connected to the system bus 68.

The analog signal processing circuits 56A and 56B takes the samples of the image signals outputted from the imaging elements 50A and 50B respectively in a timing synchronized with a timing signal generated by the timing signal generation unit. The analog signal processing circuits 56A and 56B amplifies the image signals outputted from the imaging elements 50A and 50B respectively and outputs the amplified image signals to the respective A/D converters 58A and 58B respectively. The analog signal processing circuit 56A and 56B each include a correlated double sampling (CDS) unit (not illustrated). The CDS unit includes a clamp circuit which uses, for example, a CCD-type imaging element to clamp various kinds of noise basically generated by the imaging element in response to a timing signal from the timing signal generation unit; and a sample hold circuit which holds an analog voltage signal in response to the timing signal. The CDS units of the analog signal processing circuits 56A and 56B each remove noise components included in the image signals, and outputs the image signal as an analog output signal to the A/D converters 58A and 58B respectively. The image signals outputted from the analog signal processing circuits 56A and 56B are converted to digital image data by the A/D converters 58A and 58B to be inputted to the image signal processing circuits 60A and 60B respectively. The image signal processing circuits 60A and 60B perform various kinds of image processing on the inputted image data such as a color correction, a gamma correction and a Y/C conversion. The image data outputted from the image signal processing circuits 60A and 60B is temporarily stored in the memories 62A and 62B each made of a RAM (random access memory) or the like respectively. Then, the image data is compressed by the compression/expansion processing circuit 64 and stored in a memory card 80 inserted into a memory card slot (not illustrated) of the camera 10.

A display driver 27 is also connected to the system bus 68. The display driver 27 drives a display 26 so that an image based on image data obtained by photographing can be displayed on the display 26. The display driver 27 performs display control so as to display various display modes.

The image data in the memories 62A and 62B is converted to three-dimensional image data by the three-dimensional image processing circuit 34 and then is displayed as a reproduced image on the display 26 driven by the display driver 27.

The detailed structure of the display 26 is not illustrated. The display 26 includes a parallax barrier display layer on the surface thereof. For three-dimensional display (3D display), the display 26 generates a parallax barrier made of patterns each having a light-transmitting portion and a light-shielding portion arranged alternately at a predetermined pitch on the parallax barrier display layer as well as displays strip-shaped image pieces indicating images for left and right eyes arranged alternately on the image display surface on a lower layer thereof, thereby enabling pseudo-3D view. Note that the right eye and the left eye of a viewer views the same plane image not by reconstructing the plane images obtained from the imaging elements 50A and 50B into strip-shaped image pieces to be arranged alternately, but by reconstructing only the right or left image obtained from one of the imaging elements 50A and 50B into strip-shaped image pieces to be arranged alternately. A device for 3D display in the presently disclosed subject matter may not be limited to the above described embodiment using parallax barrier.

The operation unit 74 is connected to the system bus 68. The operation unit 74 includes a release switch, a zoom button, a menu switch, an execution/screen switching switch, a selection switch, a cancel switch and an imaging mode switching switch. The CPU performs control according to the operation of the operation unit 74.

More specifically, when the release switch is operated to instruct the image data to be stored in the memory card 80, the CPU 70 reads the image data temporarily stored in the memories 62A and 62B and transfers the image data to the compression/expansion processing circuit 64. Then, the image data is compressed by the compression/expansion processing circuit 64 and then stored in the memory card 80. Note that the image data may be stored in the memory card 80 without being compressed depending on the imaging mode.

When an instruction is made to reproduce (display) an image represented by the image data stored in the memory card 80, the image data is read from the memory card 80, and the read image data is decompressed (expanded) by the compression/expansion processing circuit 64 and temporarily stored in the memories 62A and 62B. Then, the image data temporarily stored in the memories 62A and 62B is used to display (reproduce) the image on the display 26.

The zoom lens positions (zoom positions, optical zoom positions) of the imaging optical systems 14A and 14B are detected by the zoom position detection units 76A and 76B respectively. The detection signals detected by the zoom position detection units 76A and 76B are inputted into the CPU 70 as variable power information of the respective zoom lenses.

Electronic zoom magnification data is stored in the ROM (read-only memory) 71 and optical axis difference data is stored in the ROM 72.

The extraction position setting unit 73 determines the extraction position based on the zoom position, the electronic zoom magnification data, and the optical axis difference data received from the CPU 70 and outputs an instruction to the image signal processing circuits 60A and 60B. The image signal processing circuits 60A and 60B each extract the range based on the instruction from the image subjected to various kinds of image processing to be outputted to the memories 62A and 62B.

Figure 2:
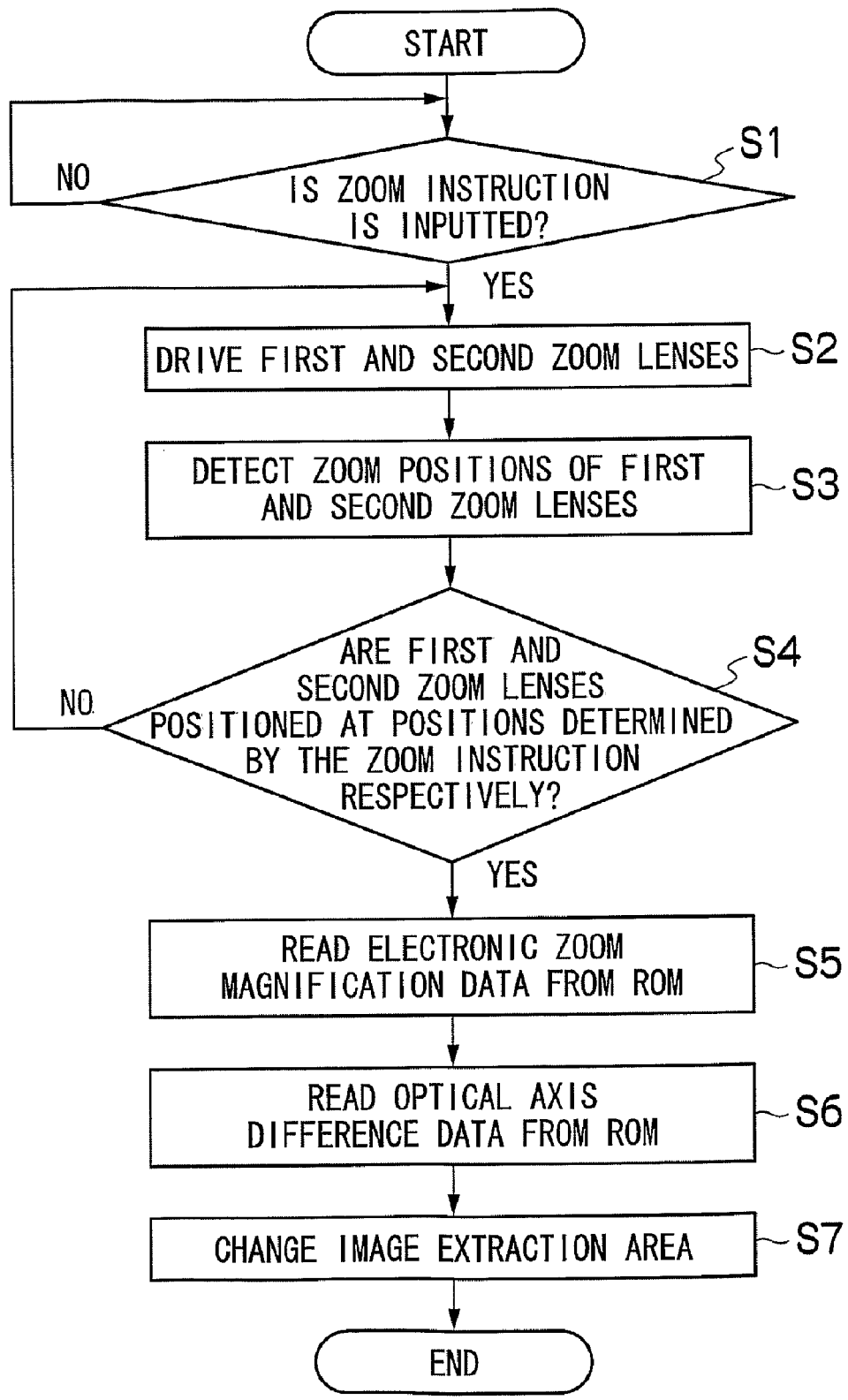
FIG. 2 is a flowchart of a correction process according to the first embodiment.

FIG. 2 is a flowchart of a correction process whose execution is controlled by CPU 70.

In step S1, a determination is made as to whether the zoom button is operated to change the zoom position. In the case of Yes, the process moves to step S2.

In step S2, according to the operation of the zoom button, the motors 24A and 24B are controlled so as to move the zoom lenses of the imaging optical systems 14A and 14B respectively to the telephoto (T) end side or the wide (W) end side.

In step S3, the current positions of the zoom lenses of the imaging optical systems 14A and 14B are acquired by the zoom position detection units 76A and 76B respectively.

In step S4, a determination is made as to whether the current positions of the zoom lenses of the imaging optical systems 14A and 14B are located in the respective positions instructed by the operation of the zoom button. In the case of Yes, the process moves to step S5. In the case of No, the process returns to step S2.

Figure 3:
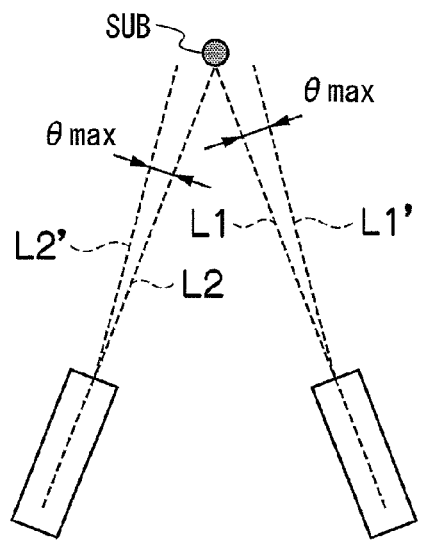
FIG. 3 illustrates an example of an allowable limit value $\theta$max of an optical axis shift.

In step S5, the electronic zoom magnification data corresponding to the respective current positions of the zoom lenses of the imaging optical systems 14A and 14B are read from the ROM 71. The electronic zoom magnification data indicates a margin of the electronic zoom extraction range of each zoom lens position sufficiently required to correct a shift amount d of the left and right viewpoint images generated by a predetermined allowable limit value (maximum optical axis shift angle) θmax (see FIG. 3) of the optical axis shift of the respective imaging optical systems 14A and 14B.

Assuming that the allowable limit value θmax of the optical axis shift is constant even when the zoom lens moves from the W end to the T end, the object point shift amount d which indicates a shift amount of an identical object (a delta of the positions of the object) in the two viewpoint images gradually increases as the zoom lens moves from the W end to the T end.

Figure 4A:
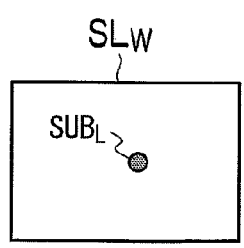
FIGS. 4A to 4H illustrate an example of electronic zoom extraction range.
Figure 4B:
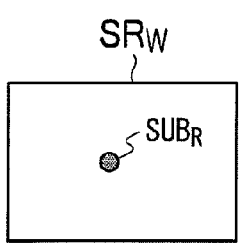
Figure 4C:
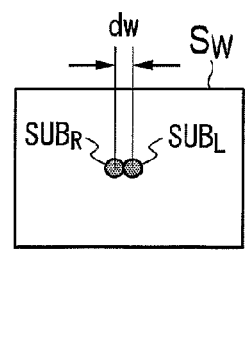
Figure 4D:
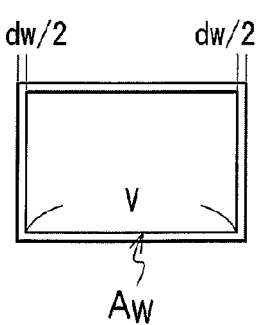

FIGS. 4A to 4H are diagrams illustrating a shift amount of the subject SUB. Referential marks $SL_W$ and $SR_W$ of FIGS. 4A and 4B are images imaged from the viewpoints corresponding to the left eye and the right eye respectively when the zoom lenses are positioned at the wide end (W end). A referential mark $S_W$ in FIG. 4C is a synthesized image generated by synthesizing the images $SL_W$ and $SR_W$. In FIGS. 4A to 4C, referential marks $SUB_L$ and $SUB_R$ represent positions of the subject SUB in the images $SL_W$ and $SR_W$ respectively. A referential mark $A_W$ in FIG. 4D indicates an electronic zoom extraction range for absorbing the horizontal object point shift amount (horizontal shift amount of the subject SUB or a delta dw of the positions $SUB_L$ and $SUB_R$).

Figure 4E:
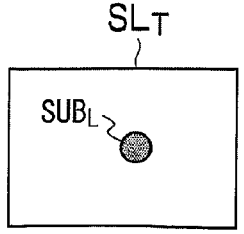
Figure 4F:
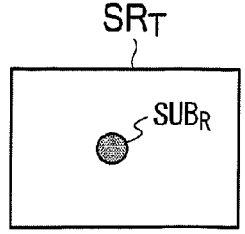
Figure 4G:
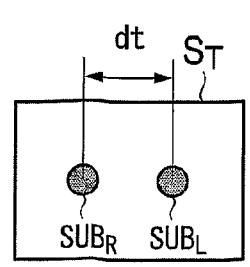
Figure 4H:
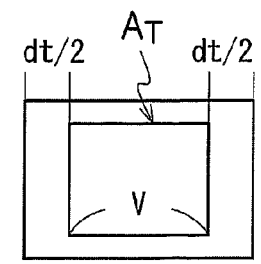

Referential marks $SL_T$ and $SR_T$ of FIGS. 4E and 4F are images imaged from the viewpoints corresponding to the left eye and the right eye respectively when the zoom lenses are positioned at the telephoto end (T end). A referential mark $S_T$ in FIG. 4G is a synthesized image generated by synthesizing the images $SL_T$ and $SR_T$. In FIGS. 4E to 4G, referential marks $SUB_L$ and $SUB_R$ represent positions of the subject SUB in the images $SL_T$ and $SR_T$ respectively. A referential mark $A_T$ in FIG. 4H indicates an electronic zoom extraction range for absorbing the horizontal object point shift amount (horizontal shift amount of the subject SUB or a delta dt of the positions $SUB_L$ and $SUB_R$).

More specifically, an assumption is made such that the imaging optical systems 14A and 14B are arranged side by side along the horizontal direction, the optical axis shift of the imaging optical systems 14A and 14B is equal to the allowable limit value θmax, and at this time the shift amount of the subject SUB of the left and right viewpoint images by the imaging optical systems 14A and 14B (a delta of the position $SUB_L$ and $SUB_R$) is "dw" at the W end and "dt" at the T end respectively as illustrated in FIGS. 4E and 4F. In this case, assuming that the current zoom position is x, the position at the W end is W, and the position at the T end is T, and the horizontal length of the original viewpoint image is L, the horizontal length V of the electronic zoom extraction range for absorbing the horizontal object point shift amount d is expressed as $V=L-dw-(dt-dw)/(T-W)\times(x-W)$. Note that if x=W, V=L−dw, and if x=T, V=L−dt (see FIGS. 4D and 4H). Since the aspect ratio of the electronic zoom extraction range (indicated by the referential marks $A_W$ and $A_T$ in FIGS. 4D and 4H respectively) conforms to that of the original viewpoint image, the electronic zoom magnification y is expressed as y=L/V. Even if the imaging optical systems 14A and 14B are arranged side bay side along the vertical direction, the electronic zoom magnification y can be obtained based on the vertical shift amount of the subject SUB in the same manner.

Here, specific numerical examples are given. If the maximum optical zoom magnification at the T end is 5 times and the shift amount dw at the W end is 2% of the image length L in the horizontal direction thereof, the maximum shift amount dt at the T end is 2×5=10% of the image length L in the horizontal direction thereof. Accordingly, the electronic zoom magnification at the W end is 1.02 times, and the electronic zoom magnification at the T end is 1.1 times. Since the electronic zoom magnification for correction increases with an increase in optical zoom magnification, the magnification of the image theoretically exceeds the optical zoom magnification specified by the user, but the apparent magnification of the image is adjusted so as to match the optical zoom magnification specified by the user.

As illustrated in FIG. 5, electronic zoom magnification data y increases proportionally as the current zoom position x increases. As illustrated in FIG. 5, if x=W ($=x_0$), $y=y_1=L/(L-dw)$, and if x=T ($=x_1$), $y=y_2=L/(L-dt)$. In other words, V becomes smaller with an increase in y. Even if the zoom position is at the W end, V is smaller than L, and the electronic zoom magnification exceeds "1". Note that the position of the W end may be set to the reference position as W=0. The above equation is stored in ROM 71, and the actual calculation of the electronic zoom magnification data y may be performed by the CPU 70.

If the optical axis shift of an individual product of the camera 10 is assumed not to exceed the allowable limit value θmax in quality control, it can be determined that the object point shift amount of the individual product of the camera 10 does not exceed d. Accordingly, in the following description, the range of performing electronic zooming using uniform electronic zoom magnification data y is determined so as to absorb the object point shift amount of any products. If the imaging optical systems 14A and 14B are arranged side by side along the horizontal direction, a parallax is formed in the horizontal direction. Thus, a horizontal shift control is performed on the extraction range so as not to destroy the parallax to determine the extraction range. Note that in the same manner as disclosed in the PTLs 6 and 7, the image extraction range may be determined so that the displayed 3D image falls within the binocular fusion range of the viewer.

In step S6, optical axis difference data is read from the ROM 72. The optical axis difference data refers to an actual optical axis shift angle of each of the imaging optical systems 14A and 14B. The data is a value specific to each product of the camera 10 and stored in the ROM 72 at manufacturing and shipment.

In step S7, based on the optical axis difference data and the electronic zoom magnification data y read by the extraction position setting unit 73, the extraction range (range of performing electronic zooming) of eliminating the object point shift due to an optical axis shift is determined. The size of the extraction range conforms to the uniform electronic zoom magnification data y, but the place of the extraction changes depending on the positional relationship of the object point shift. The aspect ratio of the extraction range is assumed to be the same as that of the original viewpoint image.

Then, the image contained in the determined extraction range is extracted from the images stored in preliminarily specified one of the memories 62A and 62B, and the extracted image is electronically magnified by magnification y (electronic zoom). Then, the magnified image is stored as a new viewpoint image in one of the memories 62A and 62B. If the object point shift can be removed, the extraction and the electronic magnification may be performed on both viewpoint images. The three-dimensional image processing circuit 34 generates a three-dimensional image (3D image) S from the new viewpoint image and the other viewpoint image not subjected to electronic zooming. Note that the viewpoint image subjected to this electronic zooming and the viewpoint image not subjected to electronic zooming may be associated with each other and stored in the memory card 80.

As described above, maximum values of an optical axis shift in the manufacturing process of an individual camera 10 are estimated, and an image shift correction region is uniformly set to every camera 10 using an electronic zoom magnification proportional to the optical zoom lens position. Accordingly, a uniformed correction region of individual product can be set according to each optical zoom position and the angle of view on the wide angle side can be maximized.

Second Embodiment

Figure 6:
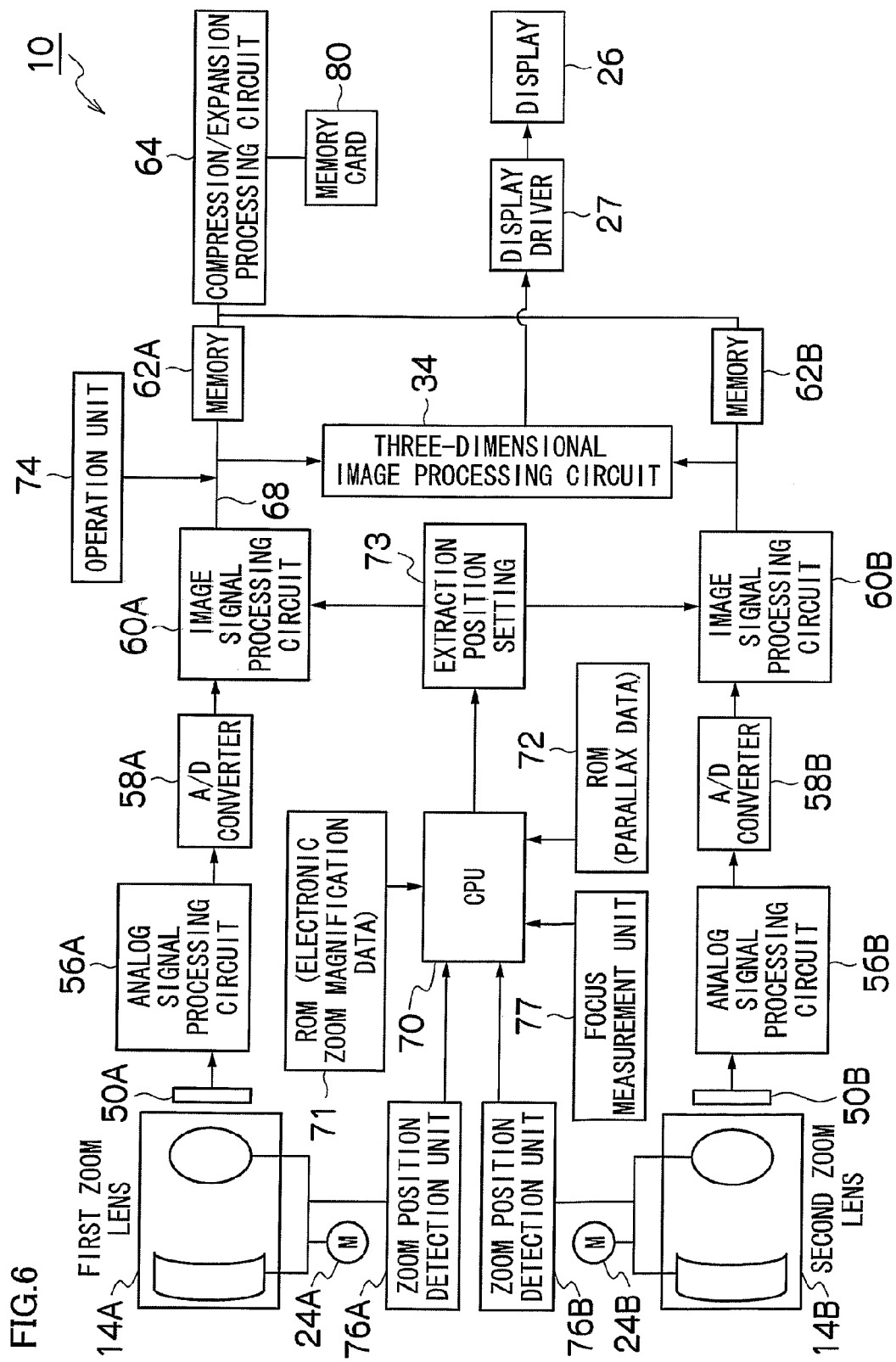
FIG. 6 is a block diagram of a camera according to a second embodiment.

FIG. 6 illustrates an electrical configuration of a camera 10 according to a second embodiment. The camera 10 includes the configuration similar to that of the first embodiment and similar reference characters or numerals refer to similar elements. The second embodiment assumes that the focused subject is located at any distance from the camera 10 and the focus lens can be moved to focus the subject. The CPU 70 performs a well known automatic focusing technique such as a contrast AF (automatic focus) and a passive AF using a triangular measurement to determine the amount of movement and instructs the motors 24A and 24B with the focus lens position of the focus lenses.

The focus measurement unit 77 measures the distance to the focused subject from the camera 10 based on the lens position of the focus lens or using a well known distance measurement technique such as the triangular measurement.

Figure 7:
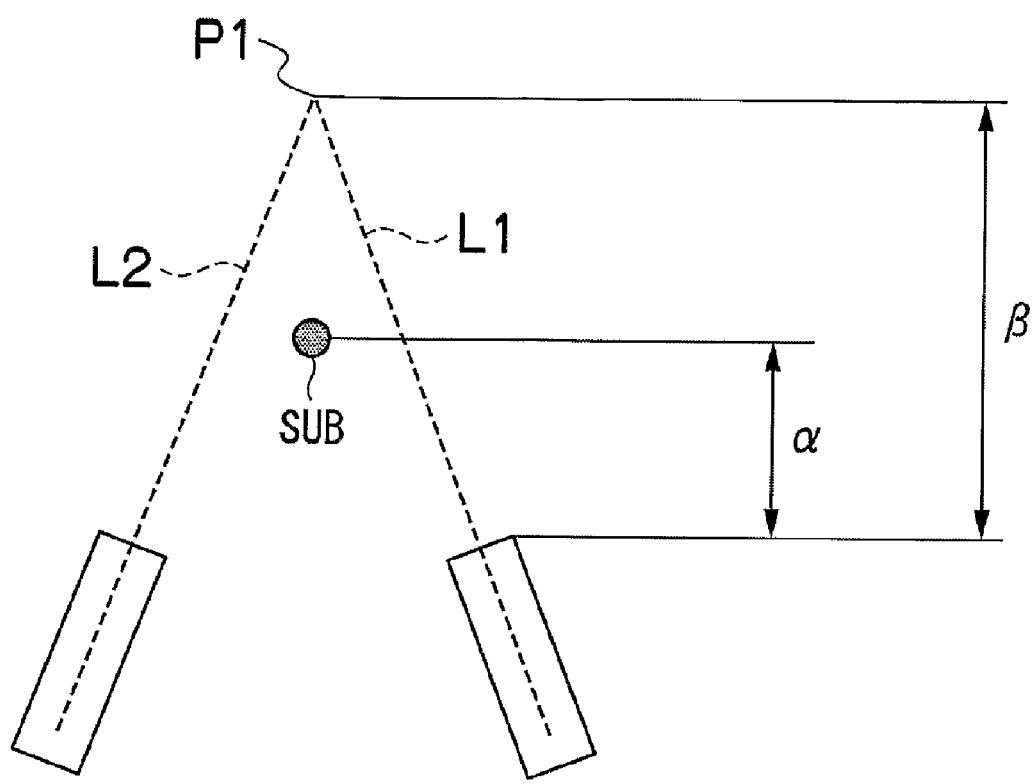
FIG. 7 illustrates an example of a shortest photographing distance $\alpha$ and a convergence angle setting distance $\beta$.
Figure 9A:
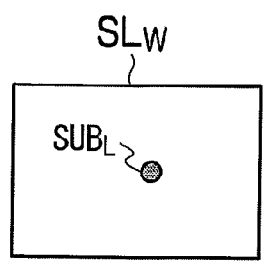
FIGS. 9A to 9H illustrate an example of electronic zoom extraction range.
Figure 9B:
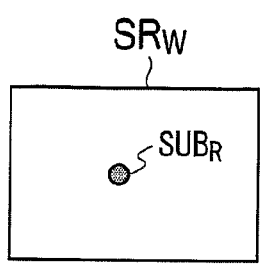
Figure 9C:
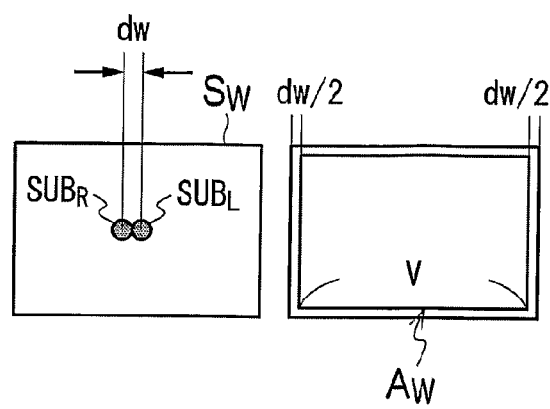
Figure 9D:
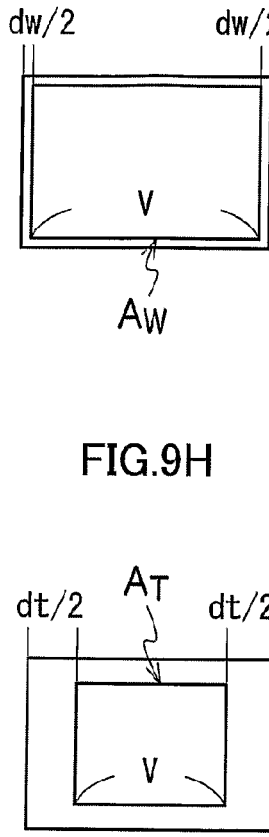
Figure 9E:
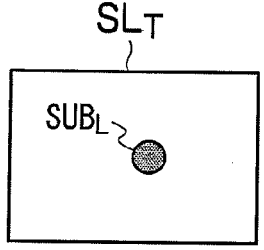
Figure 9F:
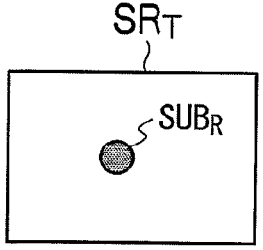
Figure 9G:
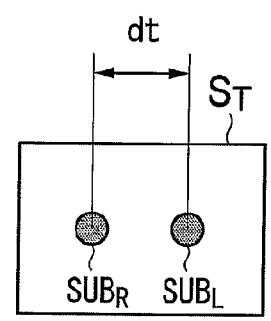
Figure 9H:
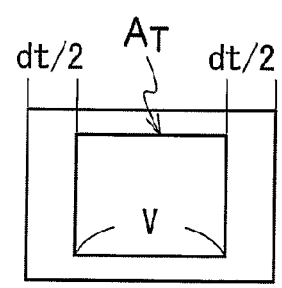

The ROM 72 stores a shortest imaging distance $\alpha$ which is a shortest distance from the camera 10 to the subject SUB at which an image of the subject SUB which can be viewed as a three-dimensional image can be imaged by the camera 10; and a convergence angle setting distance $\beta$ which is a distance from the camera 10 to the intersecting point P1 of the optical axes L1 and L2 of the imaging optical systems 50A and 50B each with a predetermined convergence angle (see FIG. 7). The parallax with respect to an object at the shortest imaging distance $\alpha$ is called a marginal parallax. The object located at a distance closer than the shortest imaging distance $\alpha$ is blurred and cannot be viewed three dimensionally. The parallax with respect to an object located at the shortest imaging distance $\alpha$ or farther (from $\alpha$ to infinity) is called an appropriate parallax. If the distance to the focused subject measured by the focus measurement unit 77 is $\alpha$ or more, the CPU 70 determines that the camera 10 can image a 3D image. Then, the CPU 70 performs shift control on the horizontal position of the extraction range to compensate for the expansion of the parallax by changing the optical zoom magnification. The determination of the extraction range is similar to that of the PTL 8 for compensating for the expansion of the parallax by changing the electronic zoom magnification.

FIG. 8 is a flowchart of a correction process executed by CPU 70.

Steps S11 to S14 are the same as steps S1 to S4 in FIG. 2 respectively.

In step S14, focused subject distance to the focused subject from the camera 10 is acquired via the focus measurement unit 77.

In step S16, a determination is made as to whether the acquired focused subject distance is the shortest imaging distance $\alpha$ of the ROM 72 or farther. In the case of Yes, the process moves to step S17. In the case of No, the process moves to step S20.

Steps S17 to S18 are the same as steps S5 to S6 in FIG. 2 respectively.

In step S19, the extraction position setting unit 73 performs shift control on the horizontal position of the extraction range with a size determined by the electronic zoom magnification y so as to compensate for the expansion of the parallax by changing the optical zoom magnification (see FIGS. 9A to 9H).

In step S20, a warning message is displayed on the display 26, indicating that the subject is too close to generate a 3D image. Note that the warning message may be vocally reproduced on a speaker (not illustrated) included in the camera 10.

The above process assures a uniform correction of a viewpoint image shift due to a change in optical zoom magnification within a range in which the camera 10 can image and generate a three-dimensional image of the subject located at any position.

Third Embodiment

Figure 10:
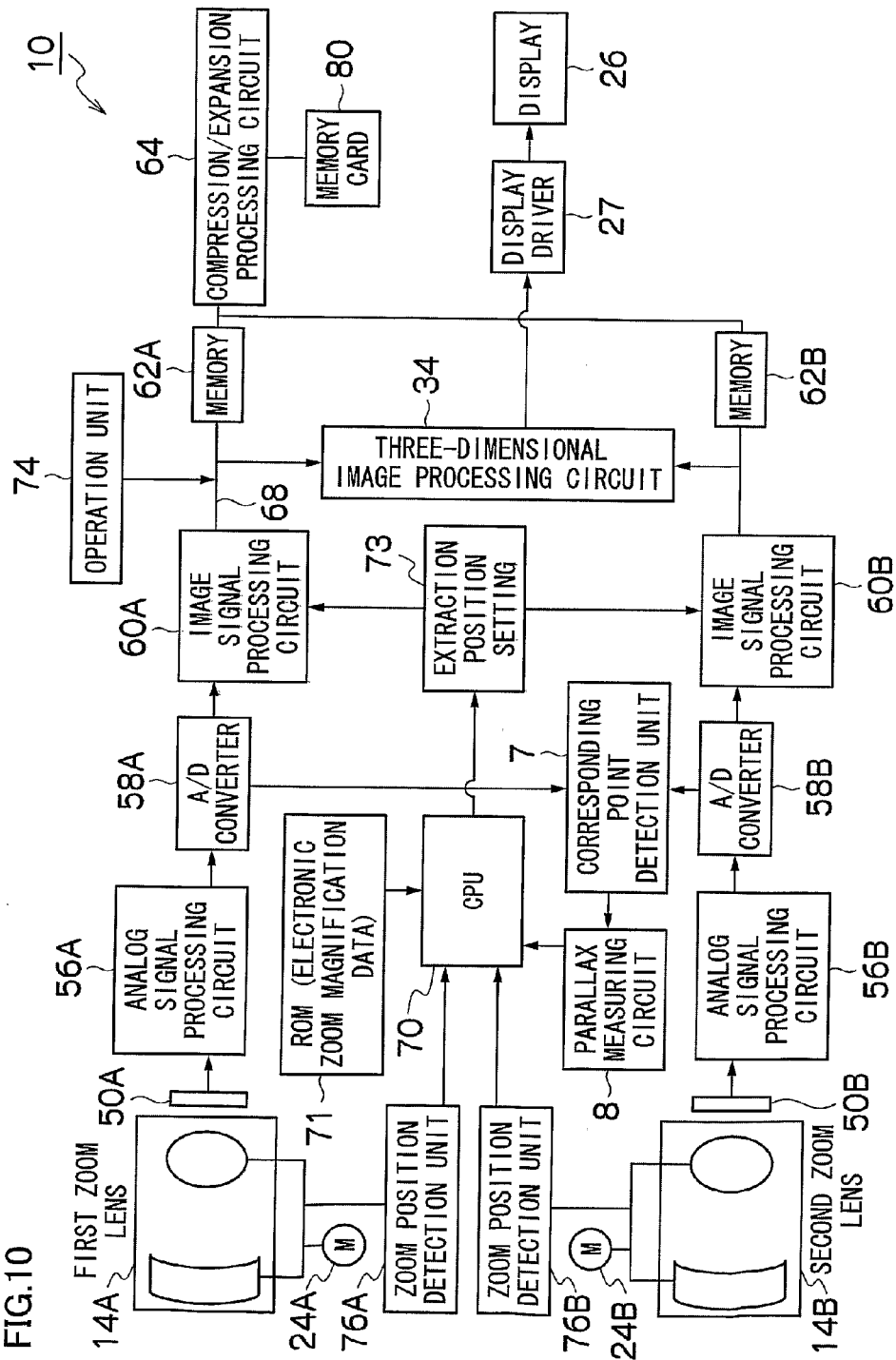
FIG. 10 is a block diagram of a camera according to a third embodiment.

FIG. 10 illustrates an electrical configuration of a camera 10 according to a third embodiment. The camera 10 includes configuration similar to that of the first and second embodiments and similar reference characters or numerals refer to similar elements.

The corresponding point detection unit 7 uses stereo matching technique to obtain mutually corresponding points on the images SR and SL acquired respectively by the imaging elements 50A and 50B. A well known technique may be applied to obtain the corresponding points. For example, the corresponding point detection unit 7 extracts parts as matrices (e.g., 3×3 pixels) from the images SR and SL respectively, calculates a correlation value thereof and obtains a pair of the corresponding points on the images SR and SL based on the correlation value. More specifically, the corresponding point detection unit 7 detects a boundary portion (edge component) where luminance and color difference are changed, from one of the images SR and SL to obtain a characteristic point, and detects the portion in another image having an edge component same as or similar to the edge component at the characteristic point as a corresponding point corresponding to the characteristic point. Alternatively, facial detection is performed on the images SR and SL and each of the head top and the jaw end of the detected face area may be detected as the characteristic point or the corresponding point of the respective images. The methods of extracting characteristic points and corresponding points need not be mutually dependent.

The parallax measuring circuit 8 calculates the parallax based on the difference in position coordinate between the characteristic point and the corresponding point in the images SR and SL.

FIGS. 11A and 11B illustrate an example of corresponding points. Referential marks SL and SR are images imaged from the viewpoints corresponding to the left eye and the right eye respectively. In FIGS. 11A and 11B, the coordinate (coordinate along the horizontal direction (x direction)) of the characteristic point PL of the image SL is X1, the coordinate of the corresponding point PR of the image SR corresponding to the characteristic point PL is X2. Then, the parallax measuring circuit 8 calculates the parallax as d=X1–X2.

FIG. 12 is a flowchart of a correction process executed by CPU 70.

Steps S21 to S24 are the same as steps S1 to S4 in FIG. 2 respectively.

In step S25, the corresponding point detection unit 7 obtains the characteristic point and the corresponding point of the images SR and SL.

In step S26, the parallax measuring circuit 8 calculates the parallax d.

Steps S27 to S30 are similar to the steps S16, S19 and S20 in FIG. 8 respectively. Note that in step S27, a determination is made as to whether the parallax d calculated by the parallax measuring circuit 8 is the shortest imaging distance α of the ROM 72 or farther. In the case of Yes, the process moves to step S28. In the case of No, the process moves to step S30. In step S29, the extraction range is set so that the parallax given to the viewer by the synthesized image generated from the corrected viewpoint image falls within the appropriate parallax range.

Thus, the parallax data needs not be preliminarily stored in the ROM 72.

It should be noted that the correction processing described in the present description can be applied not only the optical axis shift but also the magnification error and the rotation error.

In the above embodiments, the camera 10 includes two imaging optical systems for imaging two viewpoint images. However, the number of viewpoint images is not limited to two. For example, the above described process can be applied to a case where the number of the viewpoint images is more than two by selecting one of the plurality of viewpoint images as a standard, and performing an electronic zoom for the viewpoint images other than the standard images.

The presently disclosed subject matter can be provided as a computer-readable program code for causing a device (such as an electronic camera, a stereoscopic camera or a computer which can obtain images imaged (photographed) from a plurality of viewpoints) to execute the above described process, a computer-readable recording medium on which the computer-readable program code is stored or a computer program product including the computer-readable program code.

REFERENCE SIGNS LIST

7 . . . corresponding point detection unit, 14A and 14B . . . imaging optical system, 24A and 24B . . . zoom motor, 34 . . . three-dimensional image processing circuit, 50 . . . imaging element, 70 . . . CPU, 71 . . . ROM, 72 . . . ROM, 73 . . . extraction position setting unit

The invention claimed is:

1. An imaging apparatus comprising:
 a plurality of imaging units for acquiring a plurality of viewpoint images imaged from a plurality of viewpoints by a plurality of imaging optical systems each including a zoom lens;
 a storage unit for storing information on an image trimming process and a magnification process required for correcting an object point shift amount caused by at least one of optical axis shift error and magnification error of the imaging optical systems, the information relating to determination of the trimming position of the trimming process and the magnification percentage of the magnification process;
 an optical zoom magnification specifying unit for receiving a specification instruction of an optical zoom magnification;
 a plurality of zoom lens driving units for moving the zoom lenses to positions corresponding to the instruction of the optical zoom magnification received by the optical zoom magnification specifying unit; and
 a correction unit for determining the trimming position and the magnification percentage correcting an object shift amount corresponding to the positions of the zoom lenses moved by the plurality of zoom lens driving units based on the information relating to the determination of the trimming position of the trimming process and the magnification percentage of the magnification process, trimming an image in the determined trimming position from the viewpoint images, and magnifying the trimmed image based on the determined magnification percentage; and
 a three dimensional image processing unit for generating a three dimensional image based on an image extracted by the correction unit and a viewpoint image other than a viewpoint image to be corrected, and outputting the three dimensional image onto a predetermined display device.

2. The imaging apparatus according to claim 1, wherein the electronic zoom magnification set by the correction unit increases as the positions of the zoom lenses move from a wide angle side to a telephoto side.

3. An image correction method causing an imaging apparatus comprising: a plurality of imaging units for acquiring a plurality of viewpoint images imaged from a plurality of viewpoints by a plurality of imaging optical systems each including a zoom lens; an optical zoom magnification specifying unit for receiving a specification instruction of an optical zoom magnification; and a plurality of zoom lens driving units for moving the zoom lenses to a position corresponding to the instruction of the optical zoom magnification received by the optical zoom magnification specifying unit,
 to execute:
 a step of storing information on an image trimming process and a magnification process required for correcting an object point shift amount caused by at least one of optical axis shift error and magnification error of the imaging optical systems, the information relating to determination of the trimming position of the trimming process and the magnification percentage of the magnification process;
 a step of determining the trimming position and the magnification percentage correcting an object shift amount corresponding to the positions of the zoom lenses moved by the plurality of zoom lens driving units based on the information relating to the determination of the trimming position of the trimming process and the magnification percentage of the magnification process, trimming an image in the determined trimming position from the viewpoint images, and magnifying the trimmed image based on the determined magnification percentage; and
 a step of generating a three dimensional image based on an image extracted in the step of determine the trimming position and a viewpoint image other than a viewpoint image to be corrected, and outputting the three dimensional image onto a predetermined display device.

4. A non-transitory computer-readable recording medium including instructions stored thereon, such that when the instructions are read and executed by a processor, the processor is configured to perform the steps of:

storing information on an image trimming process and a magnification process required for correcting an object point shift amount caused by at least one of optical axis shift error and magnification error of imaging optical systems, the information relating to determination of the trimming position of the trimming process and the magnification percentage of the magnification process;

moving zoom lenses included in a plurality of imaging optical systems to positions corresponding to the instruction;

determining the trimming position and the magnification percentage correcting an object shift amount corresponding to the positions of the zoom lenses based on the information relating to the determination of the trimming position of the trimming process and the magnification percentage of the magnification process, trimming an image in the determined trimming position from the viewpoint images, and magnifying the trimmed image based on the determined magnification percentage; and generating a three dimensional image based on an image extracted in the step of determining the trimming position and a viewpoint image other than a viewpoint image to be corrected, and outputting the three dimensional image onto a predetermined display device.

* * * * *